Patented Feb. 19, 1946

2,395,240

UNITED STATES PATENT OFFICE 2,395,240

PROCESS FOR THE PREPARATION OF MERCAPTANS

Walter V. Wirth, Woodstown, N. J., assignor to E. I. du Pont de Nemours & Company, Wilmington, Del., a corporation of Delaware No Drawing. Application June 21, 1944, Serial No. 541,465

3 Claims. (Cl. 260—609)

This invention relates to a process for preparing mercaptans, and more particularly to an improved process for the manufacture of high molecular weight aliphatic mercaptans wherein the aliphatic halide is reacted with an alkali metal hydrosulfide in the presence of a strong reducing agent and hydrogen sulfide under pressure.

While it is known that alkyl halides can be reacted with alkali metal hydrosulfides at elevated temperatures and pressures to produce aliphatic mercaptans, it has been found that, in preparing these aliphatic mercaptans on a commercial scale where the ordinary impure grades of commercial hydrosulfide must necessarily be employed, both the yields and purity of the resulting product are low because of the side reactions which take place due to the presence of impurities usually contained in the hydrosulfide, such as the sulfides, the thiosulfates, sulfites and carbonates.

It is therefore an object of this invention to provide a process for preparing mercaptans from long chain aliphatic alkyl halides of from 8 to 18 carbon atoms wherein the ordinary commercial grades of the alkali metal hydrosulfide may be employed but which will give the high molecular weight aliphatic mercaptans in a much higher yield and of a higher purity than the known processes heretofore employed.

I have found that, where the long chain alkyl halide is reacted with an alkali metal hydrosulfide in the presence of a small amount of a strong reducing agent and hydrogen sulfide, the high molecular weight aliphatic mercaptans are obtained in an improved yield and of greater purity than are obtained by the usual methods.

The following examples are given to illustrate the invention. The parts used are by weight.

Example 1

A mild steel pressure autoclave equipped with an agitator was charged with 269 parts by weight of technical "Lorol" chloride (the "Lorol" chloride, which is a commercial product, is a mixture of aliphatic straight-chain, primary chlorides having the following approximate composition: 5% $C_{10}$, 60% $C_{12}$, 15% $C_{14}$, and 20% $C_{16}$ with an average molecular weight of 218.5), 120 parts by weight of commercial flaked 70% sodium hydrosulfide (sodium sulfhydrate), 120 parts by weight of methanol and 2 parts by weight of zinc dust. This charge filled about 70% of the autoclave capacity. The autoclave was sealed and $CO_2$ was added from a cylinder to produce 50 p. s. i. pressure on the autoclave. The charge was then heated 6 hours at 155°±5° C. A pressure of 240 p. s. i. developed on the autoclave.

After the heating period, the autoclave was cooled and the excess pressure was vented off. The charge was removed from the autoclave and filtered. 257 parts by weight of "Lorol" mercaptan, which analyzed 87.5% purity, assuming an average molecular weight of 216 corresponding to $C_{13}H_{28}S$, was separated from the filtrate by dilution with water, washing and drying. This represented 84.5% of the theoretical yield of mercaptan, based on the "Lorol."

Where this same process was repeated but in the absence of zinc dust and $CO_2$, a lower yield of a considerably less pure product was obtained.

Example 2

Same as Example 1, except that instead of 2 parts by weight of zinc dust, 1.2 parts by weight of sodium hypophosphite ($NaH_2PO_2.H_2O$) was added as the reducing agent. 256 parts by weight of oil analyzing 87.8% "Lorol" mercaptan (M. W.=216) was obtained. This represented an 84.5% of theory yield based on the "Lorol" chloride.

Example 3

Same as Example 1, except that instead of the 2 parts by weight of zinc dust, 1.2 parts by weight of reduced nickel catalyst supported on kieselguhr (about 30% reduced nickel content) was added as the reducing agent. 256 parts by weight of oil analyzing 89.3% "Lorol" mercaptan (M. W. 216) was obtained. This represented an 86.0% of theory yield based on the "Lorol" chloride.

Example 4

A steel pressure autoclave was charged with 1200 parts by weight of "Lorol" chloride (see Example 1), 520 parts by weight of methanol, 520 parts by weight of 70% sodium sulfhydrate and 4 parts by weight of zinc duct. The autoclave was closed and 30 parts by weight of carbon dioxide was added to it from a cylinder while agitating the charge. The charge was then heated to 135°–145° C. and maintained at that temperature for 6 hours. Between 190 and 220 p. s. i. of pressure developed.

After the heating period, the charge was cooled to 50° C., diluted with 1500 parts by weight of water and filtered with pressure. 1100 parts by weight of crude "Lorol" mercaptan analyzing 93% purity (M. W. 216) was obtained. This is a 92.3% of theory yield.

It will be obvious to those skilled in the art that various modifications of the process, as illustrated in the specific examples, may be made without departing from the spirit of the invention. The reaction may be carried out at temperatures of from 100° to 200° C. with good results. The reaction time will of course depend upon the temperature employed, and is determined by control tests to determine the mercaptan content. The pressure increases with the temperature, but initial pressures of from 10 to 100 p. s. i. are preferred. The proportion of the reactants can be varied over wide limits, although for good results the amount of sodium hydrosulfide (sodium sulfhydrate) should be equivalent to approximately one-fourth by weight of the amount of alkyl chloride under reaction.

Since the primary purpose of adding carbon dioxide to the reaction is to liberate hydrogen sulfide, it will of course be obvious that hydrogen sulfide itself can be used in place of the carbon dioxide. Non-oxidizing mineral or organic acids which will generate hydrogen sulfide from its salts may also be used in place of the carbon dioxide. The carbon dioxide, however, is preferred because it is inexpensive and convenient to handle. The hydrogen sulfide should be employed in such an amount (whether added as such or generated in situ) that it will be present throughout the entire reaction.

The preferred reducing agents are the finely divided metals above hydrogen in the electromotive series, and, more particularly, zinc. The amounts of reducing agent employed should be from 0.1% to 5.0% of the weight of the alkyl chloride under reaction. The use of an amount equal to from 0.3% to 1.0% of the weight of the alkyl chloride is preferred.

The invention is particularly adapted for the production of high molecular weight alkyl halides on a commercial basis, since it gives not only higher yields than the previously known processes, but gives a crude mercaptan of considerably higher purity than that previously obtained even where the commercial impure grade of sodium hydrosulfide is employed.

I claim:

1. In the process for preparing alkyl mercaptans wherein an alkyl halide of from 8 to 18 carbon atoms is reacted at elevated temperatures and pressures with an alkali metal hydrosulfide, the step which comprises carrying out the reaction in the presence of hydrogen sulfide and a finely divided metal above hydrogen in the electromotive series.

2. In the process for preparing high molecular weight aliphatic mercaptans wherein a commercial alkyl chloride comprising a mixture of alkyl chlorides containing from 10 to 16 carbon atoms is reacted in an aqueous methanolic solution of sodium hydrosulfide at elevated temperatures and pressures, the step which comprises carrying out the reaction in the presence of zinc dust and an excess of hydrogen sulfide.

3. The process of claim 2 wherein the hydrogen sulfide is generated in the reaction mass by adding carbon dioxide thereto under pressure.

WALTER V. WIRTH.